United States Patent
Kuo

(10) Patent No.: US 12,386,006 B2
(45) Date of Patent: Aug. 12, 2025

(54) METHOD FOR MEASURING ANGLE OF ARRIVAL WITH PHASED ARRAY

(71) Applicant: TMY Technology Inc., Taipei (TW)

(72) Inventor: Hsuan-Hung Kuo, Taipei (TW)

(73) Assignee: TMY Technology Inc., Taipei (TW)

( * ) Notice: Subject to any disclaimer, the term of this patent is extended or adjusted under 35 U.S.C. 154(b) by 475 days.

(21) Appl. No.: 17/940,010

(22) Filed: Sep. 8, 2022

(65) Prior Publication Data

US 2023/0152410 A1   May 18, 2023

Related U.S. Application Data

(60) Provisional application No. 63/279,684, filed on Nov. 16, 2021.

(30) Foreign Application Priority Data

Mar. 3, 2022 (EP) .................................... 22159863

(51) Int. Cl.
*G01S 3/16* (2006.01)

(52) U.S. Cl.
CPC ..................... *G01S 3/16* (2013.01)

(58) Field of Classification Search
CPC ........ G01S 3/143; G01S 3/16; G01S 3/00–74; H01Q 3/2605; H01Q 3/30–42
See application file for complete search history.

(56) References Cited

U.S. PATENT DOCUMENTS

| | | | | |
|---|---|---|---|---|
| 4,881,078 A | * | 11/1989 | Yamane | .................. H01Q 3/08 342/368 |
| 10,892,813 B2 | | 1/2021 | Orhan et al. | |
| 2006/0109168 A1 | * | 5/2006 | Nakanishi | ................. G01S 3/16 342/146 |
| 2012/0086602 A1 | | 4/2012 | Park et al. | |

(Continued)

FOREIGN PATENT DOCUMENTS

| CN | 112865846 | 5/2021 |
|---|---|---|
| EP | 3809604 | 4/2021 |

(Continued)

OTHER PUBLICATIONS

Haynes, Tony, "A Primer on Digital Beamforming", Spectrum Signal Processing, Mar. 26, 1998 (Year: 1998).*

(Continued)

*Primary Examiner* — Cassi J Galt
(74) *Attorney, Agent, or Firm* — JCIPRNET

(57) ABSTRACT

The disclosure is directed to a method for measuring an angle of arrival (AoA), with a steerable phased array. The method would include but not limited to: receiving a signal by the steerable phased array with a first steering angle and with a second steering angle; obtaining a first power-related information (PRI1) of the signal corresponding to the first steering angle; obtaining a second power-related information (PRI2) of the signal corresponding to the second steering angle; and calculating an AoA of the signal based on the first power-related information and the second power-related information, wherein the first steering angle is different from the second steering angle, and an absolute difference between the first steering angle and the second steering angle is less than FNBW/2.

14 Claims, 14 Drawing Sheets

(56) References Cited

U.S. PATENT DOCUMENTS

| | | |
|---|---|---|
| 2014/0269389 A1 | 9/2014 | Bukkfejes et al. |
| 2014/0302869 A1 | 10/2014 | Rosenbaum et al. |
| 2017/0074962 A1 | 3/2017 | Badawy et al. |
| 2020/0103231 A1 | 4/2020 | Wang et al. |

FOREIGN PATENT DOCUMENTS

| | | |
|---|---|---|
| JP | 2011169895 | 9/2011 |
| JP | 6530046 | 6/2019 |
| JP | 2019158498 | 9/2019 |
| TW | I710227 | 11/2020 |
| TW | 202116091 | 4/2021 |

OTHER PUBLICATIONS

"Notice of allowance of Japan Counterpart Application", issued on Aug. 8, 2023, p. 1-p. 3.

Harald T. Friis, "A Note on a Simple Transmission Formula", Proceedings of the I.R.E. and Waves and Electrons, 34(5), May 1946, pp. 254-256.

Suhanya Jayaprakasam et al., "Robust Beam-tracking for mmWave Mobile Communications", IEEE Communications Letters, 21(12), Sep. 4, 2017, pp. 2654-2657.

Fuliang Liu et al., "EKF-based Beam Tracking for MmWave MIMO Systems", IEEE Communications Letters, 23(12), Sep. 10, 2019, pp. 2390-2393.

"Office Action of Taiwan Counterpart Application", issued on Feb. 6, 2024, pp. 1-7.

\* cited by examiner

METHOD FOR MEASURING ANGLE OF ARRIVAL WITH PHASED ARRAY

CROSS-REFERENCE TO RELATED APPLICATION

This application claims the priority benefit of U.S. provisional application Ser. No. 63/279,684, filed on Nov. 16, 2021 and European application serial no. 22159863.4, filed on Mar. 3, 2022. The entirety of each of the above-mentioned patent application is hereby incorporated by reference herein and made a part of this specification.

TECHNICAL FIELD

This disclosure is related to phased array, and, particularly, to a method for rapid measurement of the angle of arrival (AoA) with a steerable phased array.

BACKGROUND

In modern telecommunicating systems, the frequency of the carrier is getting higher and higher so as to allow broader signal bandwidth. According to Frii's transmission equation, the ratio between the power received by the receiver ($P_r$) and the power emitted by the transmitter ($P_t$) is expressed as:

$$\frac{P_r}{P_t} = D_t D_r \left(\frac{\lambda}{4\pi R}\right)^2 \quad (1)$$

In equation (1), $D_t$ and $D_r$ denote the directivity of the antenna of the transmitter and that of the antenna of the receiver, respectively. It is obvious that the wavelength of the carrier decreases as the frequency thereof increases, and therefore the attenuation or decay of the signal get worse because the ratio $P_r/P_t$ decreases as the wavelength $\lambda$ decreases. To compensate the path loss, a conventional and obvious solution is to increase either or both of the directivity $D_t$ and $D_r$ of the antennas.

However, as the directivity increases, the beam width, usually expressed as the half-power beam width (HPBW), decreases. In consequence, the transmitter and the receiver are easily missing each other when they are in moving. The device or beam tracking techniques are a broadly investigated area. Although some algorithms based on the extended Kalman filter (EKF) have been proposed, the accuracy and precision of the AoA measurements still have impact on the prediction result thereof. Hence, an on-the-fly method for measuring the AoA of a beam is in need.

SUMMARY

Accordingly, a method for measuring the angle of arrival (AoA) of a beam is provided. The provided method is operable in an on-the-fly application.

In one of exemplary embodiments, the disclosure is directed to a method for measuring an angle of arrival (AoA), with a steerable phased array. The method would include but not limited to: receiving a signal by the steerable phased array with a first steering angle and with a second steering angle; obtaining a first power-related information (PRI1) of the signal corresponding to the first steering angle; obtaining a second power-related information (PRI2) of the signal corresponding to the second steering angle; and calculating an AoA of the signal based on the first power-related information and the second power-related information, wherein the first steering angle is different from the second steering angle, and an absolute difference between the first steering angle and the second steering angle is less than FNBW/2.

In one of exemplary embodiments, the disclosure is directed to a communication device. The communication device would include but not limited to a transceiver, a storage medium, and a processor. The transceiver would include but not limited to a steerable phased array. The processor is coupled to the transceiver and the storage medium. The processor is configured to: receive a signal by the steerable phased array with a first steering angle and with a second steering angle; obtain a first power-related information (PRI1) of the signal corresponding to the first steering angle; obtain a second power-related information (PRI2) of the signal corresponding to the second steering angle; and calculate an AoA of the signal based on the first power-related information and the second power-related information, wherein the first steering angle is different from the second steering angle, and an absolute difference between the first steering angle and the second steering angle is less than FNBW/2.

It should be understood, however, that this summary may not contain all of the aspect and embodiments of the disclosure and is therefore not meant to be limiting or restrictive in any manner. Also, the disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
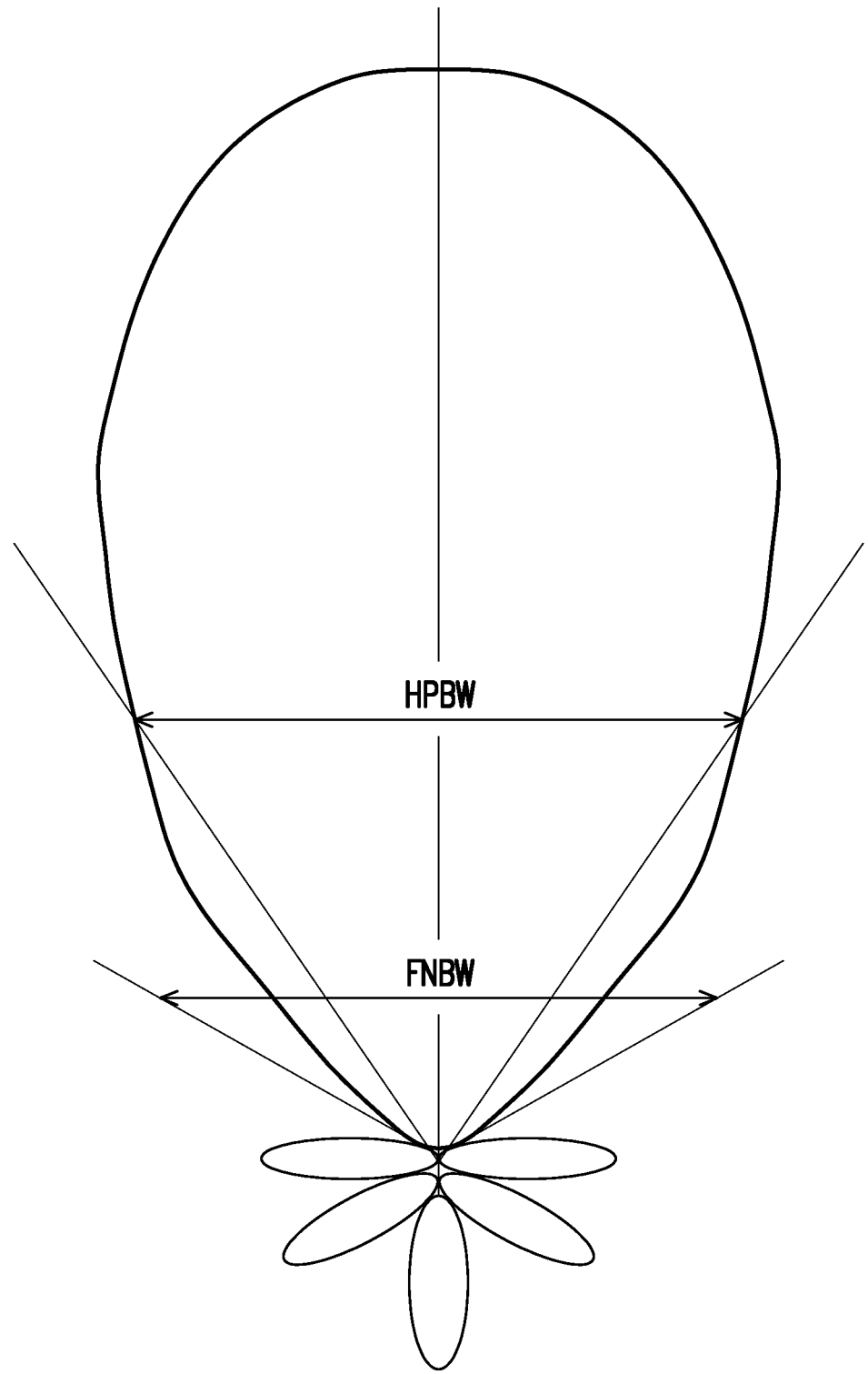
FIG. 1 is a schematic diagram of a beam radiation pattern of a phased array according to an embodiment of the disclosure.

In order to make the aforementioned features and advantages of the disclosure comprehensible, exemplary embodiments accompanied with figures are described in detail below. It is to be understood that both the foregoing general description and the following detailed description are exemplary, and are intended to provide further explanation of the disclosure as claimed.

Reference will now be made in detail to the embodiments of the disclosure, examples of which are illustrated in the accompanying drawings. Wherever possible, the same reference numbers are used in the drawings and the description to refer to the same or like parts.

FIG. 1 is a schematic diagram of a beam radiation pattern of a phased array according to an embodiment of the disclosure. Referring to FIG. 1, a beam radiation pattern of a phased array may include a main lobe and several side lobes. The main lobe is the main beam of the phased array where maximum and constant energy is radiated by the phased array. Beam width is the range where most of the power is radiated in the main lobe of the beam radiation pattern. In practice, beam width is usually expressed as half-power beam width (HPBW) or first null beam width (FNBW).

The HPBW is defined as the angular separation between the points where the power of the beam radiation pattern decreases by 50% (or −3 dB) from the peak of the main beam. As shown in FIG. 1, a line is drawn between two half power points on the main lobe on both the sides. The angle between the half power points is the HPBW of the beam radiation pattern.

The FNBW is defined as the angular separation between the first null points where the magnitude of the beam radiation pattern is zero near the main lobe. As shown in FIG. 1, a line is drawn between two first null points near the main lobe on both the sides. The angle between the first null points is the FNBW of the beam radiation pattern. It can be seen from FIG. 1 that the HPBW is smaller than the FNBW.

A phased array may switch between steering angles to measure an angle of arrival. Different steering angles may result in different beam radiation patterns. Thus, the HPBW or the FNBW may change with the different steering angles.

The uniformly linear phased array (ULA) is the most commonly used phased array. The half-power beam width of a uniformly linear phased array with N antenna elements with the steering angle of $\theta_S$ could be expressed as:

$$HPBW(\theta_S) \approx \frac{\lambda\sqrt{\pi}}{2Nd\cos\theta_S}(\text{rad}) = \frac{50.777\lambda}{Nd\cos\theta_S}(deg) \quad (2)$$

Here, d denotes the spacing between the centroids of two adjacent antenna cells, and $\lambda$ denotes the wavelength of the electromagnetic wave that is emitted and/or received by the antenna cells.

For example, for a phased array with four antenna elements (N=4) with the spacing of half of wavelength (d=$\lambda$/2) and the steering angle of zero degree ($\theta_S$=0), the HPBW is about 25.4 degrees. If the information signal comes from a direction close to the steering angle, the receiving power of the information signal would not change a lot when the steering angle is changed for about 5 degrees and therefore the quality of communication may remain acceptable. Within a short time-span, the absolute difference between steering angles is small and the change in the received power at different steering angles may be assumed to be negligible such that the main lobe of the beam radiation pattern may be approximated by a parabolic curve (represented as a parabolic function) associated with a difference angle and HPBW. Therefore, assuming absolute difference between the steering angles is bounded by a threshold, an angle of arrival may be estimated by the steering angles and their corresponding power-related information (PRI). In one embodiment, the threshold may be associated with FNBW and/or HPBW of the main lobe of the beam radiation pattern.

Figure 2:
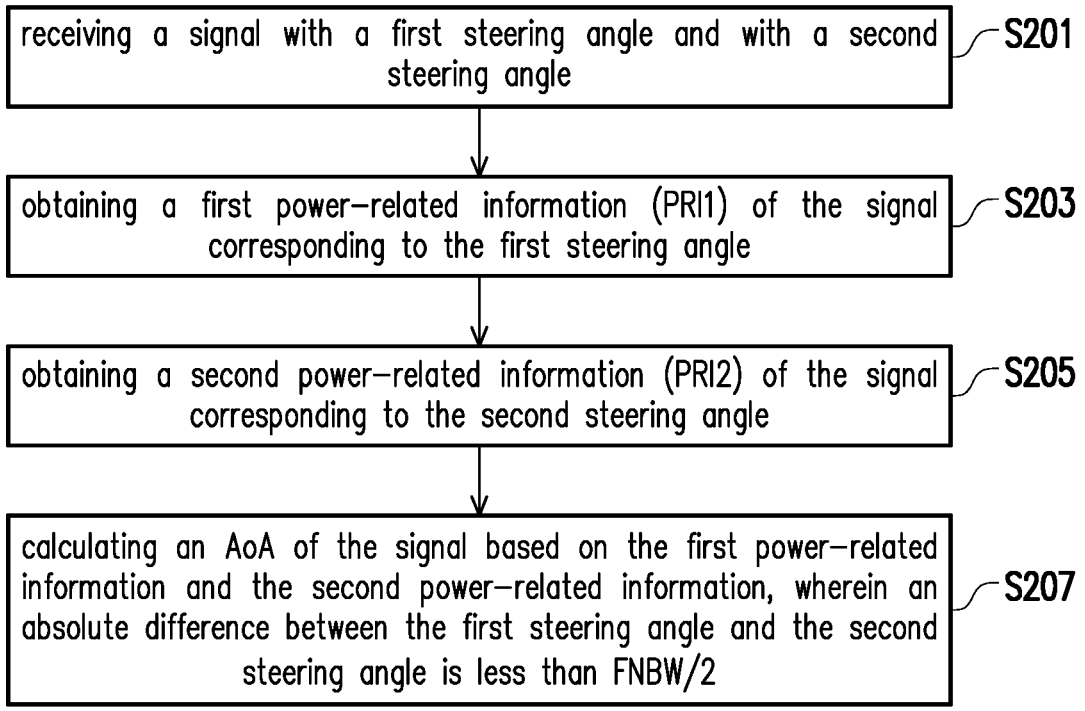
FIG. 2 is a flowchart of a method for measuring an angle of arrival according to an embodiment of the disclosure.

FIG. 2 is a flowchart of a method for measuring an angle of arrival according to an embodiment of the disclosure. The method may be adapted to a steerable phased array. In step S201, the phased array receives a signal with a first steering angle and with a second steering angle. In step S203, the phased array obtains a first power-related information (PRI1) of the signal corresponding to the first steering angle. In step S205, the phased array obtains a second power-related information (PRI2) of the signal corresponding to the second steering angle. In step S207, the phased array calculates an AoA of the signal based on the first power-related information and the second power-related information.

It should be noted that the first steering angle is different from the second steering angle, and the absolute difference between the first steering angle and the second steering angle is less than a threshold.

In one embodiment, the steerable phased array may use a digital beamforming architecture. In this embodiment, the step S201 may be further implemented in the digital beamforming architecture. Concretely, the steerable phased array receives the signal by N selected antenna elements in the steerable phased array to obtain N signal streams corresponding to a first time slot, where N is an integer. The steerable phased array applies a first set of parameters onto the N signal streams before aggregating the N signal streams so as to digitally apply the first steering angle onto an aggregated signal. The steerable phased array applies a second set of parameters onto the N signal streams before aggregating the N signal streams so as to digitally apply the second steering angle onto the aggregated signal.

The step S201 and the step S203 do not significantly influence the signal transmission adversely. Therefore, the method could be used in on-the-fly applications, i.e., the situation in which the signal transmission or signal reception are taking part in the telecommunication.

In one embodiment, the absolute difference between the first steering angle and the second steering angle is less than FNBW/2.

In one embodiment, the absolute difference between the first steering angle and the second steering angle is less than HPBW/2.

In one embodiment, the absolute difference between the first steering angle and the second steering angle is less than HPBW/4.

Figure 3:
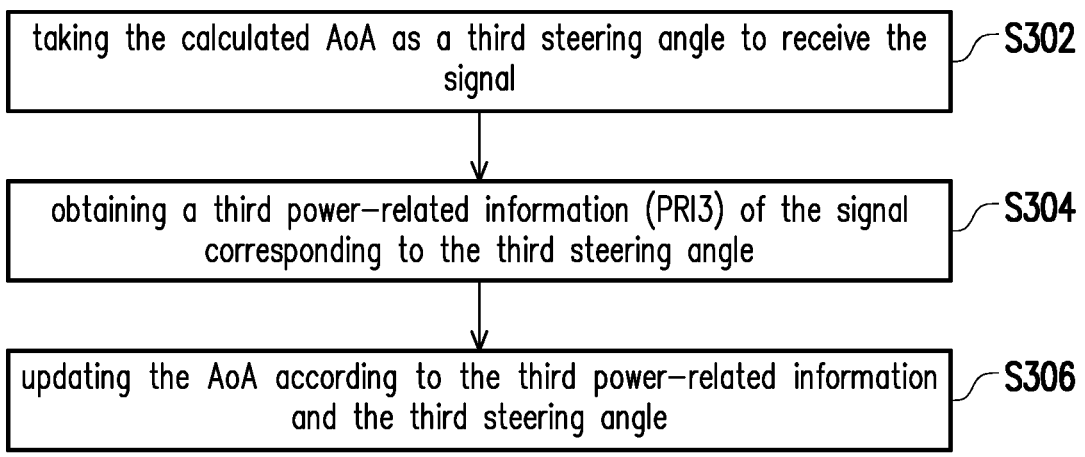
FIG. 3 is a flowchart of updating an angle of arrival according to an embodiment of the disclosure.

FIG. 3 is a flowchart of updating an angle of arrival according to an embodiment of the disclosure. The steps in FIG. 3 could be view as variants of step S207 in FIG. 2. Please refers to FIG. 3. In step S302, the phased array takes the calculated AoA as a third steering angle to receive the signal. Concretely, the calculated AoA may be the result calculated from step S207. The calculated AoA may also be an estimate of the present AoA obtained by a prediction mechanism such as Kalman filter. In step S304, the phased array obtains a third power-related information (PRI3) of the signal corresponding to the third steering angle. In step S306, the phased array updates the AoA according to the third power-related information and the third steering angle.

In one embodiment, the first power-related information and the second power-related information may be expressed in a measure that includes but not limited to at least one of received power, signal-to-noise ratio (SNR), error vector magnitude (EVM), bit-error rate (BER), and carrier-to-noise ratio (C/N). Similarly, the third power-related information may be expressed in a measure that includes but not limited to at least one of received power, signal-to-noise ratio (SNR), error vector magnitude (EVM), bit-error rate (BER), and carrier-to-noise ratio (C/N).

As an exemplary example, the first power-related information and the second power-related information may be carrier-to-noise ratio (C/N). The point now comes to how to obtain the $C/N_1$ of the signal corresponding the first steering angle and the $C/N_2$ of the signal corresponding the second steering angle. It is possible to calculate the $E_b/N_0$ from the bit error rate (BER) though that relationship varies with the modulation and coding schemes. Then, the C/N is calculated based on the obtained $E_b/N_0$ based on the following equation:

$$\frac{C}{N} = \frac{E_b}{N_0} \times \frac{f_b}{B} \quad (3)$$

Here, $f_b$ denotes the net bit rate or the data rate of the channel, and B denotes the channel bandwidth. Both of them are predetermined or obtainable. Hence, it is possible to calculate the C/N based on the BER, and $C/N_1$ and $C/N_2$ are now obtained from the BER of the data with respect to the first segment of information signal corresponding to the first steering angle and the BER of the data with respect to the second segment of information signal corresponding to the second steering angle.

[Parabolic Approximation]

A simplified mechanism of calculating the angle of arrival (AoA) based on the obtained $C/N_1$ and $C/N_2$ is based on a parabolic approximation to the shape of the main lobe of a phased array. Ideally, the field pattern of amplitude related to a uniformly linear phased array with N antenna elements could be expressed as:

$$G_A(\theta) = AF(\theta, \theta_S) \times EF(\theta) \quad (4)$$

Here, $G_A$ denotes the magnitude gain of the phased array, AF denotes the array factor, and EF denotes the element factor, which is also known as the field pattern of the antenna cell. In one embodiment, the phased array is firstly switched to the first steering angle $\theta_{S1}$ to receive the signal from a source. The phased array is then switched to the second steering angle $\theta_{S2}$, by digital means or analog means, to receive the same signal from the source. The ratio between the power received at first steering angle and the power received at the second steering angle is expressed as:

$$P_{r1,dB} - P_{r2,dB} = AF(AoA, \theta_{S1})_{dB} - AF(AoA, \theta_{S2})_{dB} \quad (5)$$

The impact from the element factor is therefore removed. When the ratio of the power received and the model of the array factor AF are both known, the angle of arrival AoA is then derivable. It is known that the array factor AF could be expressed as:

$$AF(\theta, \theta_S) = \frac{\sin\left(\frac{N\pi d}{\lambda}[\sin\theta - \sin\theta_S]\right)}{N\sin\left(\frac{\pi d}{\lambda}[\sin\theta - \sin\theta_S]\right)} \quad (6\text{-}1)$$

$$AF(\theta, \theta_S) \approx \frac{\sin\left(\frac{N\pi d}{\lambda}[\theta - \theta_S]\cos\theta_S\right)}{N\frac{\pi d}{\lambda}[\theta - \theta_S]\cos\theta_S} \quad (6\text{-}2)$$

However, there are some obstacles preventing the equation (6-1) and/or the equation (6-2) from being applicable. The first one is that these equations are transcendental functions and it is difficult to get their logarithm value (dB). Another issue is that these equations are only suitable, in theory, for a uniformly linear phased array (ULA) while most phased arrays in use are not perfect ULAs whose real radiation patterns are much more complex than equation (6-1) and/or (6-2). A simplified methodology is therefore introduced in this disclosure. It is known that any high order functions or any transcendental functions can be approximated or approached by a second order polynomial/a parabolic function.

Figure 4A:
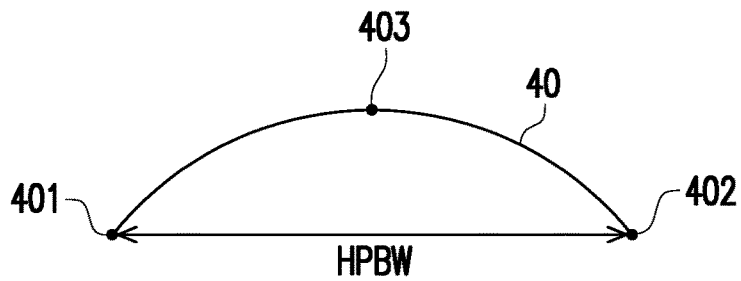
FIG. 4A is a schematic diagram of HPBW and points used in approximation of a main lobe of a beam radiation pattern according to an embodiment of the disclosure.

FIG. 4A is a schematic diagram of HPBW and points used in approximation of a main lobe of a beam radiation pattern according to an embodiment of the disclosure. Referring to FIG. 4A, the shape of main lobe 40 of a beam radiation pattern may be approximated by a parabolic curve which is represented as a parabolic function defined by two half-power points 401, 402 and a peak point 403. The half-power points 401 and 402 correspond to two steering angles that have half received power $P_{AF}/2$ and the peak point 403 corresponds to a steering angle that have the peak power $P_{AF}$. Thus, a parabolic curve (as a parabolic function) is determined by the power and steering angles of the three points 401, 402, and 403 so as to fit the shape of the main lobe 40.

According to the abovementioned assumption and the equation (2), the approximation could be expressed as:

$$P_{AF}(\Delta\theta, \theta_S) = 1 - 2\left(\frac{\Delta\theta}{HPBW_{\theta_S}}\right)^2 = 1 - 2\left(\frac{\Delta\theta N d \cos\theta_S}{50.777\lambda}\right)^2 (deg) \quad (7)$$

Here, $\Delta\theta$ is a difference angle which denotes the difference between a selected angle and the steering angle. In equation (7), $\lambda$ is the wavelength of the carrier signal in the first medium where the antenna array is located. In a conventional example, it is the wavelength of the carrier signal in the free space or in the air. However, even if the antenna array is located under the sea, the disclosed method is still applicable.

Taking a one-dimensional array with four antenna elements for example. If the spacing between two adjacent antenna elements, d, is equal to half of the operation wavelength, the equation (7) yields the following result:

$$P_{AF}(\Delta\theta,\theta_S) = 1 - 8\left(\frac{\Delta\theta\cos\theta_S}{50.777}\right)^2 (\Delta\theta \text{ and } \theta_S \text{ in } deg) \quad (8)$$

$$P_{AF,db}(\Delta\theta,\theta_S) = 10\log\left(1 - 8\left(\frac{\Delta\theta\cos\theta_S}{50.777}\right)^2\right)(\Delta\theta \text{ and } \theta_S \text{ in } deg) \quad (9)$$

$P_{AF,dB}$ denotes the array factor in decibel value for the aforementioned example. If the value of the difference angle $\Delta\theta$ is no more than 5 degrees, the variance is much less than 1. Hence, the equation (9) can be approximated according to the first order Taylor series of the natural logarithm function such that equation (9) can be expressed as the following equation (10):

$$P_{AF,dB}(\Delta\theta,\theta_S) \approx k(\Delta\theta\cos\theta_S)^2 (\Delta\theta \text{ and } \theta_S \text{ in } deg) \quad (10)$$

In general, k is a coefficient associated with the number of antenna elements N, the spacing between two adjacent antenna elements d, and wavelength λ. In one embodiment, the coefficient k in equation (10) is k=—0.0135 for a phased array with four antenna element (N=4) and spacing d=λ/2.

Figure 4B:
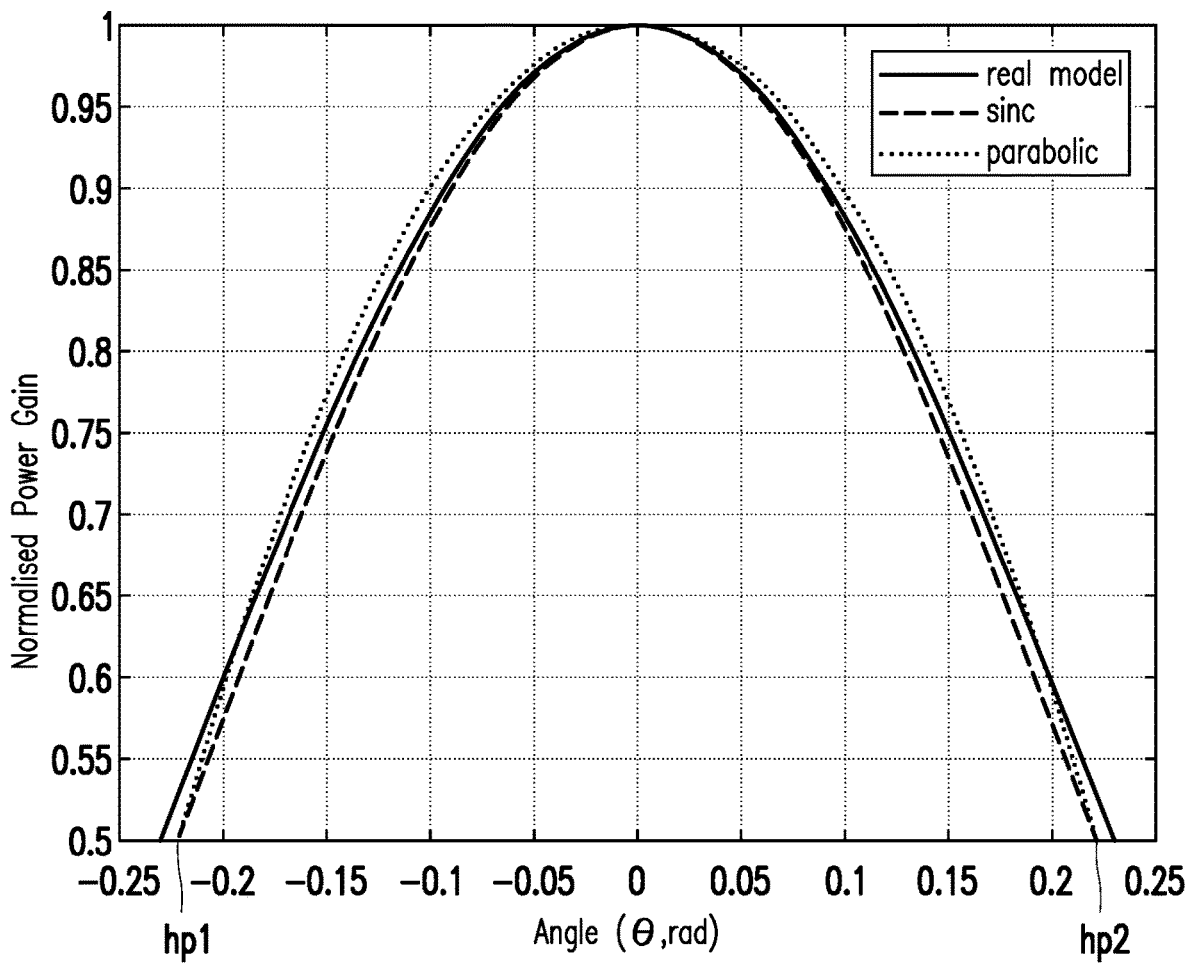
FIG. 4B is a schematic diagram of parabolic approximation of the main lobe of a beam radiation pattern according to an embodiment of the disclosure.

FIG. 4B is a schematic diagram of parabolic approximation of the main lobe of the array factor of a beam radiation pattern according to an embodiment of the disclosure. FIG. 4B shows the real model, approximation by sine function, and parabolic approximation of the array factor for a phased array with four antenna elements (N=4). The real model is the shape of main lobe as described by equation (6-1). The approximation by sine function corresponds to the shape of main lobe as described by equation (6-2). The parabolic approximation corresponds to the shape of main lobe as described by equation (7).

At angle θ=0 degree, the approximation by sine function and the parabolic approximation fit the peak power point on the main lobe of the real model. The points hp1 and hp2 are the approximated half-power points according to the parabolic approximation. It is worth noting that the parabolic approximation matches the approximation by sine function at points hp1 and hp2, and the points hp1 and hp2 are close to the left and right half-power points as characterized by the real model. Thus, the parabolic approximation by equation (7) provides a good approximation to the real model, in particular, when the difference angle $\Delta\theta$ is small. For example, in the embodiment that the number of antenna elements is four and the spacing is half of wavelength, the difference angle $\Delta\theta$ is set to be less than 5 degrees, which is much less than the half of the theoretical HPBW thereof.

Figure 5:
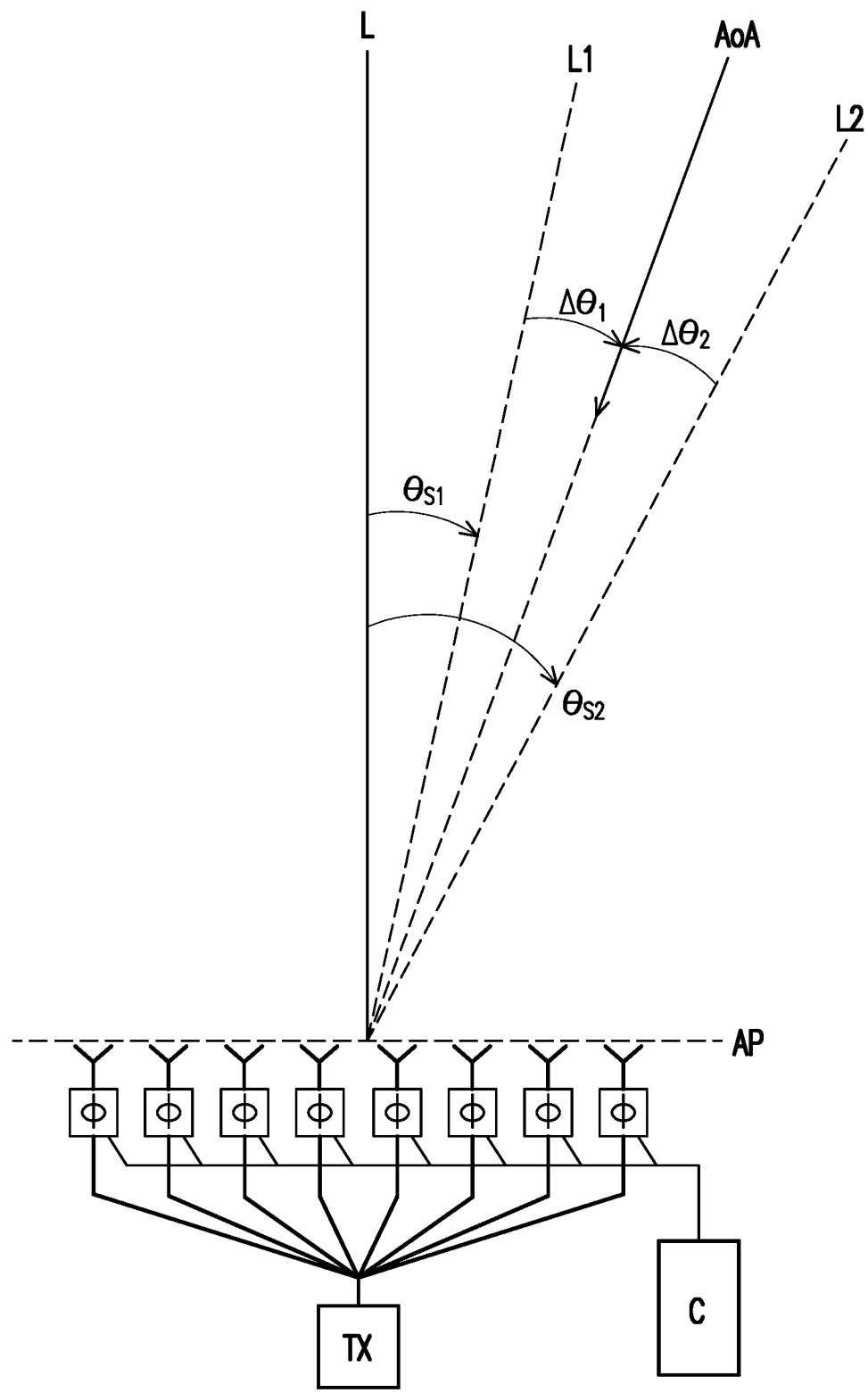
FIG. 5 is a schematic diagram of switching steering angles to calculate an AoA according to an embodiment of the disclosure.

FIG. 5 is a schematic diagram of switching steering angles to calculate an AoA according to an embodiment of the disclosure. Please refers to FIG. 5. The vertical line L is a reference line which is orthogonal to array plane AP of a phased array. The phased array may be steered to a first steering angle $\theta_{S1}$ corresponding to the dashed line L1 so as to receive the coming signal. Then, the phased array may be steering to a second steering angle $\theta_{S2}$ corresponding to the dashed line L2 so as to receive the coming signal. This corresponds to the step S201 as described in FIG. 2. It is noted that the first steering angle $\theta_{S1}$ and the second steering angle $\theta_{S2}$ are different. Now, in order to measure an angle of arrival (AoA) of the coming signal, a selected angle is replaced with the AoA, and the antenna array is at first instance steered to the first steering angle $\theta_{S1}$ which is calculated or predicted by some algorithm to be around the AoA. The value of the difference angles $\Delta\theta_1$ and $\Delta\theta_2$ are expressed as the difference between AoA and the first steering angle $\theta_{S1}$ and the second steering angle $\theta_{S2}$, respectively.

Then, the power received could be expressed as:

$$G_{RX,dB}(\text{AoA},\theta_{S1}) = P_{AF,dB}(\text{AOA}-\theta_{S1},\theta_{S1}) + P_{EF,dB}(\text{AoA}) \quad (11)$$

Assuming the signal power per se is kept unchanged, the antenna array is then switching its steering angle to the second steering angle $\theta_{S2}$, and the power received could be expressed as:

$$G_{RX,dB}(\text{AoA},\theta_{S2}) = P_{AF,dB}(\text{AOA}-\theta_{S2},\theta_{S2}) + P_{EF,dB}(\text{AoA}) \quad (12)$$

The difference between $G_{RX,dB}(\text{AoA}, \theta_{S2})$ and $G_{RX,dB}(\text{AoA}, \theta_{S1})$ in dB, which is equivalent to the ratio in power, could be written as:

$$\Delta G_{RX,dB}(\text{AoA},\theta_{S1},\theta_{S2}) = P_{AF,dB}(\text{AoA}-\theta_{S2},\theta_{S2}) - P_{AF,dB}(\text{AoA}-\theta_{S1},\theta_{S1}) \quad (13)$$

According to equation (10), equation (13) could be rewritten as:

$$\Delta G_{RX,dB}(\text{AoA},\theta_{S1},\theta_{S2}) = k(\Delta\theta_2\cos\theta_{S2})^2 - k(\Delta\theta_1\cos\theta_{S1})^2 \quad (14)$$

In equations (13)-(14), $\Delta G_{RX,dB}(\text{AoA}, \theta_{S1}, \theta_{S2})$ is a decibel value of a ratio between the received power $P_{AF,dB}(\text{AOA}-\theta_{S2}, \theta_{S2})$ at the second steering angle $\theta_{S2}$ and the received power $P_{AF,dB}(\text{AoA}-\theta_{S1}, \theta_{S1})$ at the first steering angle $\theta_{S1}$.

Figure 6A:
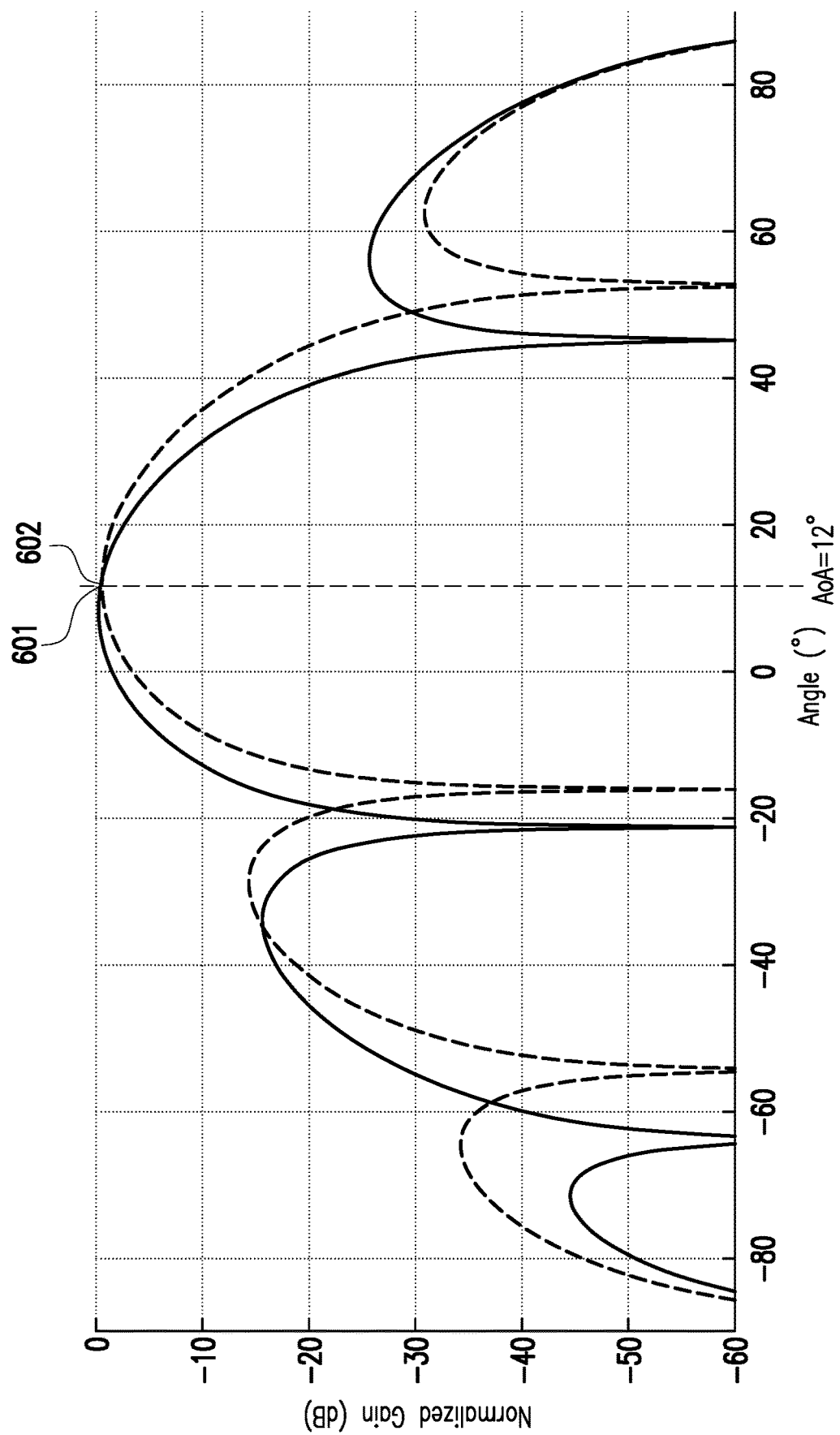
FIG. 6A to 6C are schematic diagrams of the beam radiation field patterns for understanding how the proposed method works when the actual AoA is 12° according to an embodiment of the disclosure.
Figure 6B:
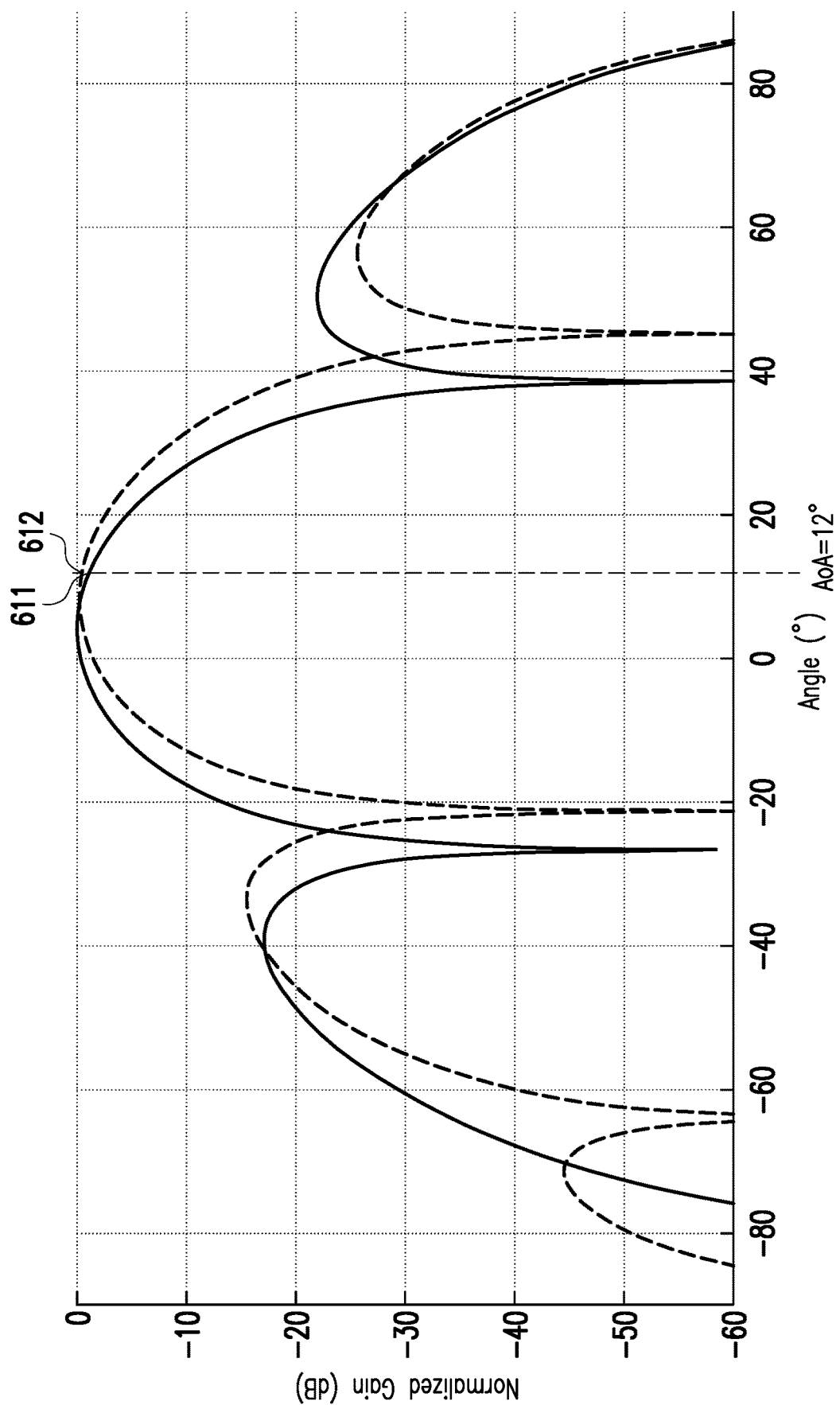
Figure 6C:
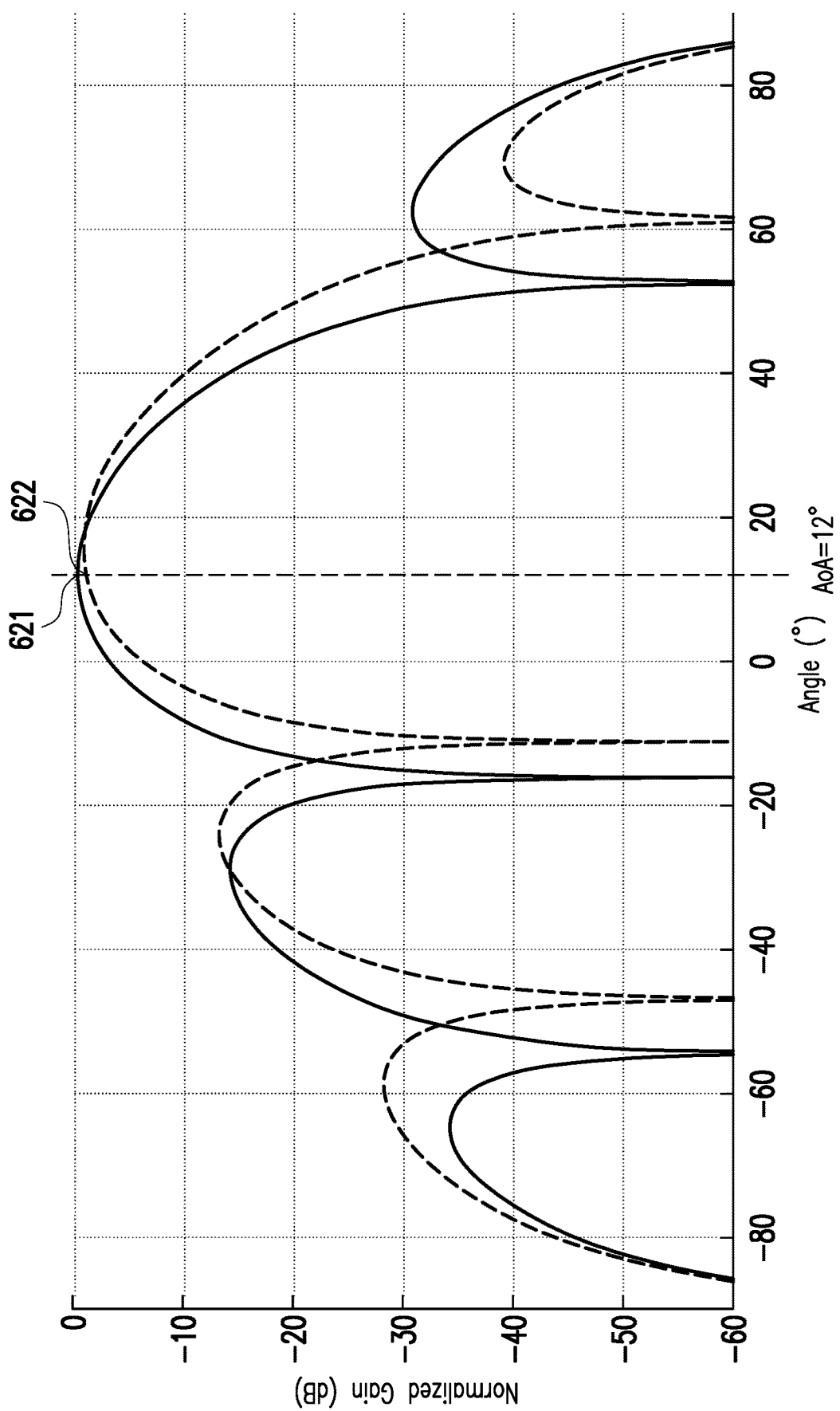

FIG. 6A to 6C are schematic diagrams of the beam radiation field patterns for understanding how the proposed method works when the actual AoA is 12° according to an embodiment of the disclosure.

Please refer to FIG. 6A to FIG. 6C. Each of FIG. 6A to FIG. 6C depicts the real pattern of the antenna array with four antenna elements and spacing of half of wavelength. The right/upward axis and directions represent positive and left/downward axis and directions represent negative. In FIG. 6A to 6C, the AoA is at 12°. In FIG. 6A, the first steering angle $\theta_{S1}$ is 10° while the second steering angle $\theta_{S2}$ is 15°. The first steering angle corresponds to point 601 on the main lobe. At point 601, the power received (in dB) is −0.5265 dB. The second steering angle corresponds to point 602 on the main lobe. At point 602, the power received (in dB) is −0.5930 dB. From the example in FIG. 6A, it is obtained the difference of power received (in dB) between the points 601 and 602 is −0.0665 dB.

In the previous assumption, it is known that:

$$\Delta\theta_1 - \Delta\theta_2 = \Delta\theta_S = \theta_{S2} - \theta_{S1} \quad (15)$$

$$\Delta\theta_1 = \begin{cases} \dfrac{-b + \sqrt{b^2 - 4ac}}{2a} & \text{for } \Delta\theta_S > 0 \\ \dfrac{-b - \sqrt{b^2 - 4ac}}{2a} & \text{for } \Delta\theta_S < 0 \end{cases} \quad (16)$$

$$a = \cos^2\theta_{S1} - \cos^2\theta_{S2} \quad (17)$$

$$b = 2\Delta\theta_S\cos^2\theta_{S2} \quad (18)$$

$$c = -\Delta\theta_S^2\cos^2\theta_{S2} - \frac{\Delta G_{RX,dB}}{m} \quad (19)$$

In one embodiment, the value of m is calculated as:

$$m = \frac{(Nd/\lambda)^2}{296} \qquad (20)$$

In equation (20), N is number of antenna elements, d is spacing between two adjacent antenna elements, and λ is wavelength of the signal. Here, the denominator "296" on the right-hand side of equation (20) is a locally optimal value. In other embodiments, the value of the denominator may be slightly different from "296". In one embodiment, the denominator is obtained when the steerable phased array is manufactured or calibrated. The denominator is then recorded in the system, such as in a storage medium in the system. The denominator is determined in accordance with the actual half-power beam width of the steerable array or the set of antenna elements performing the disclosed technique. The range of the denominator may change with the difference angle $\Delta\theta_S$ since the variance of the difference angle $\Delta\theta_S$ would influence approximation error.

With equations (15) to (19) substituted all the variables known, the calculated first difference angle $\Delta\theta_1$ is 1.9577°, so the calculated AoA is computed from the first steering angle and the first difference angle as $\theta_{S1}+\Delta\theta_1=11.9577°$. That is, the calculated AoA is very close to the actual AoA when the actual AoA is between two steering angles.

In FIG. 6B, the first steering angle $\theta_{S1}$ is 10° while the second steering angle $\theta_{S2}$ is 5°. The first steering angle corresponds to point 611 on the main lobe. At point 611, the power received (in dB) is −1.1648 dB. The second steering angle corresponds to point 612 on the main lobe. At point 612, the power received (in dB) is −0.5266 dB. From FIG. 6B, it is obtained the difference of power received (in dB) between the points 611 and 612 is −0.6382 dB. With equations (15) to (19) substituted all variables known, the calculated first difference angle $\Delta\theta_1$ is 2.2474°, so the calculated AoA is $\theta_{S1}+\Delta\theta_1=12.2474°$. In this example, even if the second steering angle, compared with the first steering angle, is moving away from the actual AoA, the calculated AoA is still very close to the actual AoA.

In FIG. 6C, the first steering angle $\theta_{S1}$ is 20° while the second steering angle $\theta_S$ is 15°. The first steering angle corresponds to point 621 on the main lobe. At point 621, the power received (in dB) is −0.5930 The second steering angle corresponds to point 622 on the main lobe. At point 622, the power received (in dB) is −1.3302. From FIG. 6C, it is obtained the difference of power received (in dB) between the points 621 and 622 is 0.7372 dB. With equations (15) to (19) substituted all variables known, the calculated $\Delta\theta_1$ is −8.7582°, so the calculated AoA is $\theta_{S1}+\Delta\theta_1=11.2418°$. Accordingly, it is possible to estimate the actual AoA based on the ratio between the power received at the second steering angle and the power received at the first steering angle, vice versa. In this example, even if the actual AoA is far from the first steering angle and the second steering angle, the calculated AoA still provides a relatively accurate prediction of the actual AoA.

Assuming the channel between the signal source and the receiver is an additive white Gaussian noise (AWGN) channel, the noise in the system when the steering angle is slightly changed shall be kept unchanged. Hence, the ratio between the carrier signal at these two measured periods (first steering angle and second steering angle) is the same as the ratio between the SNR thereof. That is, the ratio of $SNR_2/SNR_1$ or the difference between $SNR_{2,dB}$ and $SNR_{1,dB}$ has the same meaning as the ratio between the carrier signals. That is, all power-related information can be expressed in a measure, such as SNR, BER, C/N, EVM, and/or the power of the received signal. Different measures are all applicable in the embodiments of this disclosure.

Based on the above, some extended methods may be derived. First, the successive three measurements of the coming signal can provide the estimated change in AoA, based on the SNR ratio obtain from the second steering angle and from the first steering angle, and based on the SNR ratio obtain from the third steering angle and from the second steering angle. As described in steps S302, S304, and S306, the phased array may keep calculating and updating new AoA based on a new steering angle and the corresponding SNR ratio, iteratively. The retrieved AoAs, each one or in combination, could serve as the input data for the Kalman filter so as to predict the future AoA. Further, even if the predicted AoA is not exactly the correct AoA, the proposed method is capable of suggesting an approximate direction of the correct AoA.

Figure 7A:
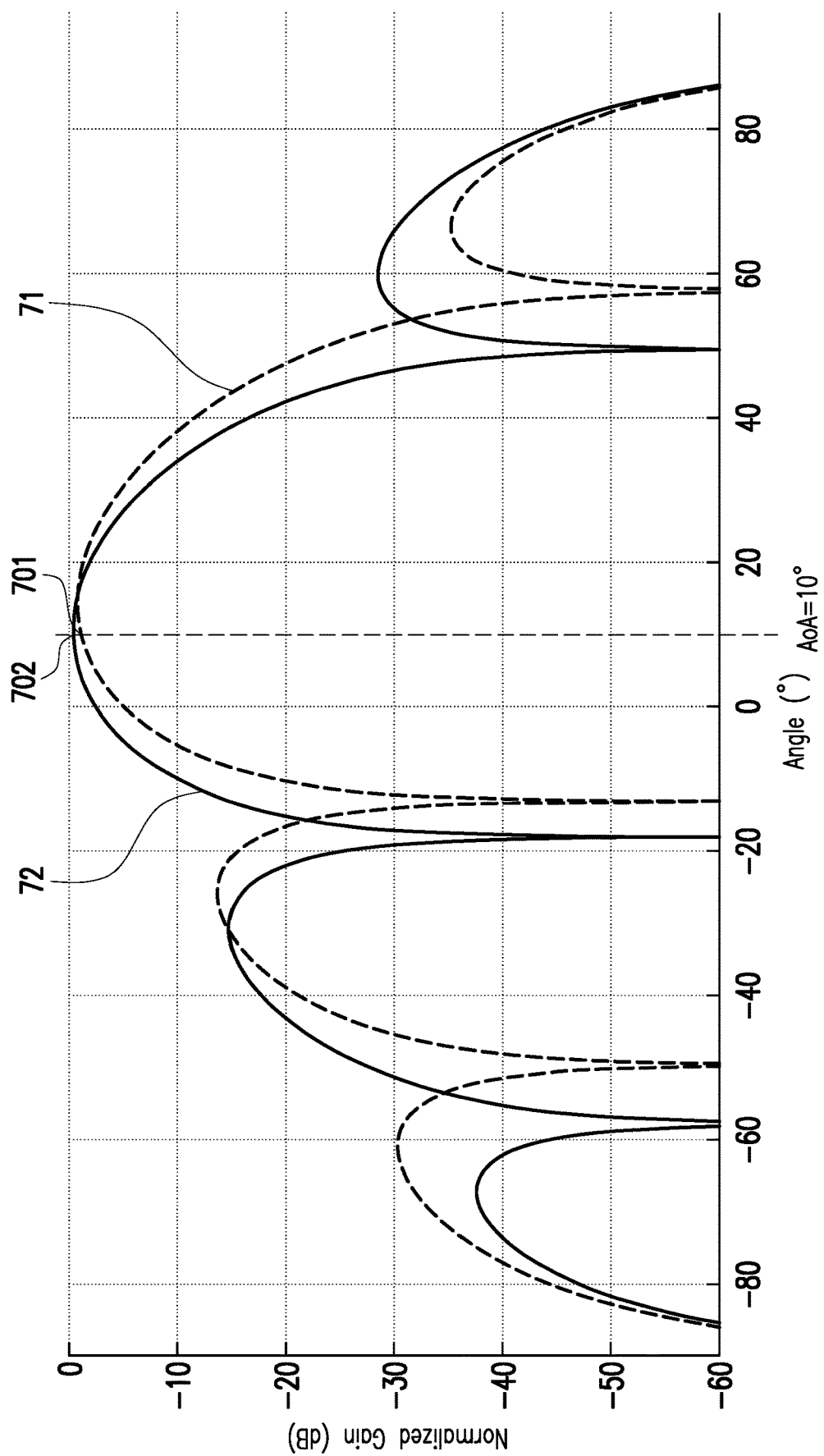
FIG. 7A and FIG. 7B are schematic diagrams of the examples illustrating that the proposed method provides a converged result for fast tracking according to an embodiment of the disclosure.
Figure 7B:
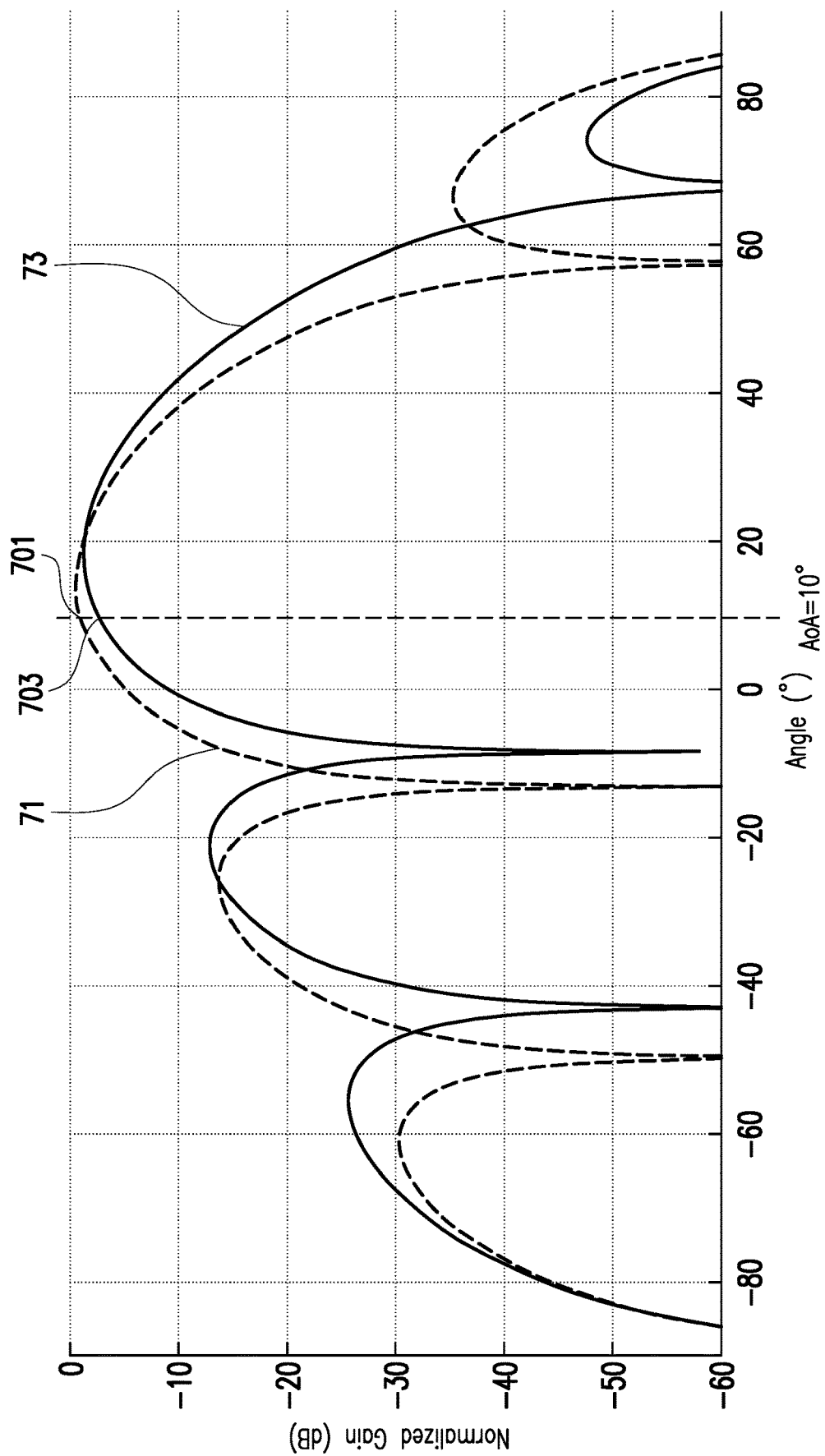

FIG. 7A and FIG. 7B are schematic diagrams of the examples illustrating that the proposed method provides a converged result for fast tracking according to an embodiment of the disclosure. In FIG. 7A and FIG. 7B, the AoA is 10°.

Please refer to FIG. 7A. For example, if the predicted AoA is 18° while the actual AoA is 10°. The first example can be observed in FIG. 7A that the first steering angle is 18° and the second steering angle is 13°. The first steering angle corresponds to the main lobe 71. The second steering angle corresponds to the main lobe 72. The power at the point 701 on the main lobe 71 and the power at the point 702 on the main lobe 72 could be obtained respectively. At point 701, the power received (in dB) is −1.2024 dB. At point 702, the power received (in dB) is −0.4504 dB. For a phased array with four antenna element (N=4) and spacing d=212, the coefficient is k=−0.0135. According to the obtained power ratio (SNR ratio), the calculated AoA based on equations (15) to (19) is 9.2796°. If the third steering angle is chosen as 9°, the calculated AoA based on the power at 13° and the power at 9° is 9.9311°.

Now please refer to FIG. 7B. Similarly, the second example can be observed in FIG. 7B that the first steering angle is 18° and the second steering angle is 23°. The first steering angle corresponds to the main lobe 71. The second steering angle corresponds to the main lobe 73. The power at the point 701 on the main lobe 71 and the power at the point 703 on the main lobe 73 could be obtained respectively. At point 701, the power received (in dB) is −1.2024 dB. At point 703, the power received (in dB) is −2.668 dB. According to the same method based on equations (15) to (19), the calculated AoA is 6.8654°, and this suggests the correct side (left hand side). If a third steering angle is chosen as 7°, the calculated AoA based on the power at 18° and the power at 7° is 9.6832°. Therefore, the method is capable of yielding a converged result with S302, from the calculated AoA in S207. The proposed methods in FIG. 2 and FIG. 3 could be applied to on-the-fly applications, and the convergent effect could be advantageous in practical use cases for fast tracking. The methods could be adapted to a phased array using an analog beamforming architecture or a phased array using a digital beamforming architecture.

Figure 8:
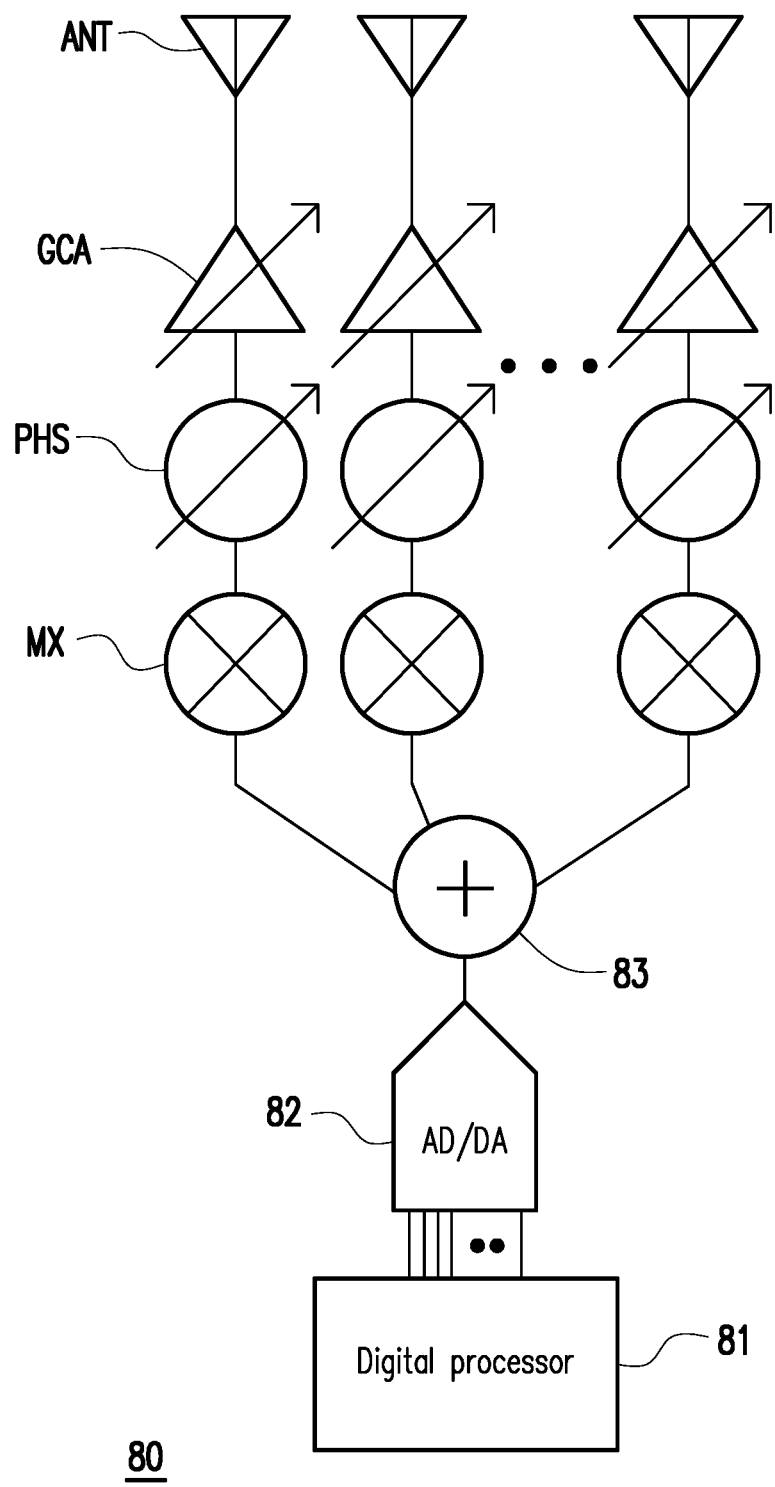
FIG. 8 is a schematic diagram of a phased array using an analog beamforming architecture according to an embodiment of the disclosure.

FIG. 8 is a schematic diagram of a phased array using an analog beamforming architecture according to an embodiment of the disclosure. In an analog beamforming architecture, phased array 80 may include digital processor 81, AD/DA converter 82, aggregator 83, a plurality of mixers MX, a plurality of phase shifters PHS, a plurality of gain controllable amplifiers GCA, and a plurality of antenna elements ANT. Digital processor 81 is coupled to AD/DA converter 82. AD/DA converter is coupled to the plurality of mixers MX. In analog beamforming, phased array 80 receives signals in different time slots. Concretely, phased array 80 may be steered to a first steering angle to receive a first signal in a first time slot, and then phased array 80 may be steered to a second steering angle to receive a second signal in a second time slot. In the previous embodiments, the first signal and the second signal both come from the same signal source so as to determine the AoA of the signal from said signal source. However, the first signal and the second signal may come from different signal sources. Gain controllable amplifiers GCA adjust the gain of the signals received from antenna elements ANT, respectively. After the received signals pass through phase shifters PHS and mixers MX, aggregator 83 aggregates the signals and feeds the aggregated signal into the AD/DA converter 82. The AD/DA converter 82 then converts the signals into digital data that are further processed by digital processor 81. It should be noted that analog beamforming architecture may require only one AD/DC for the plurality of antenna elements ANT, but the signals have to be received in different time slots.

Figure 9:
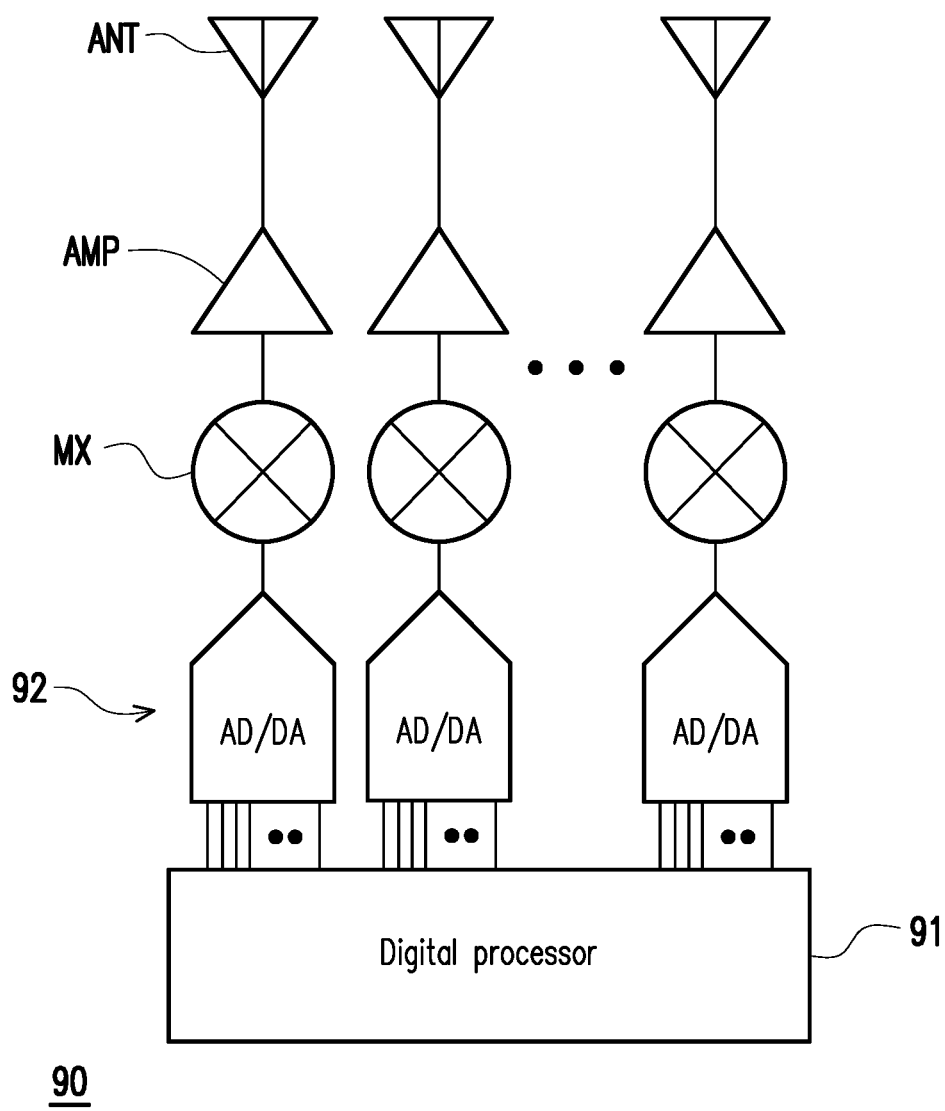
FIG. 9 is a schematic diagram of a phased array using a digital beamforming architecture according to an embodiment of the disclosure.

FIG. 9 is a schematic diagram of a phased array using a digital beamforming architecture according to an embodiment of the disclosure. In a digital beamforming architecture, phased array 90 may include digital processor 91, a plurality of AD/DA converters 92, a plurality of mixers MX, a plurality of amplifiers AMP, and a plurality of antenna elements ANT. The digital processor 91 is coupled to the plurality of AD/DA converters 92. The signals received from the antenna elements ANT pass through their corresponding amplifiers AMP and mixers MX, respectively. Then, the plurality of AD/DA converters 92 convert the signals into digital data to be further processed by digital processor 91.

In one embodiment, if the antenna array is using the digital beamforming technique, there is no need to receive the signal in different time slots. The steps S201 and S203 could be done in the baseband by digitally changing the steering angle and doing the same process illustrated above in S205~S207. Explicitly, a first sequence of wireless signal SEQ1 is received by the array. Then, the digital processor 91 applies a first set of steering setting parameters onto the SEQ1 so that it seems that the array is steered at the first steering angle $\theta_{S1}$ to receive the SEQ1. Meanwhile, the SEQ1 is stored in a non-transitory storage, such as the buffer of the digital processor 91, for further processing. Then, while the digital processor 91 is continuing to apply the first set of steering setting parameters onto the following sequence of the received signal, the other processor or a thread in the same processor is applying a second set of steering setting parameters onto the SEQ1 so that it seems the SEQ1 was received by the array with the second steering angle $\theta_{S2}$. In one embodiment, the $C/N_1$ and the $C/N_2$ is then used to perform the step S205 so as to obtain the AoA of SEQ1. In this embodiment, the $C/N_1$ and the $C/N_2$ are related to the same sequence of signal, SEQ1, so the environmental factor influencing the C/N or the power has been eliminated and therefore the prediction of the AoA would be closer to the actual AoA.

The aforementioned embodiments assume that the signal from the signal source kept unchanged during the measurement. The method for measuring an AoA as described in FIG. 2 and FIG. 3 could be generally applied to a communication device that includes the phased array 80 using analog beamforming or the phased array 90 using digital beamforming.

Figure 10:
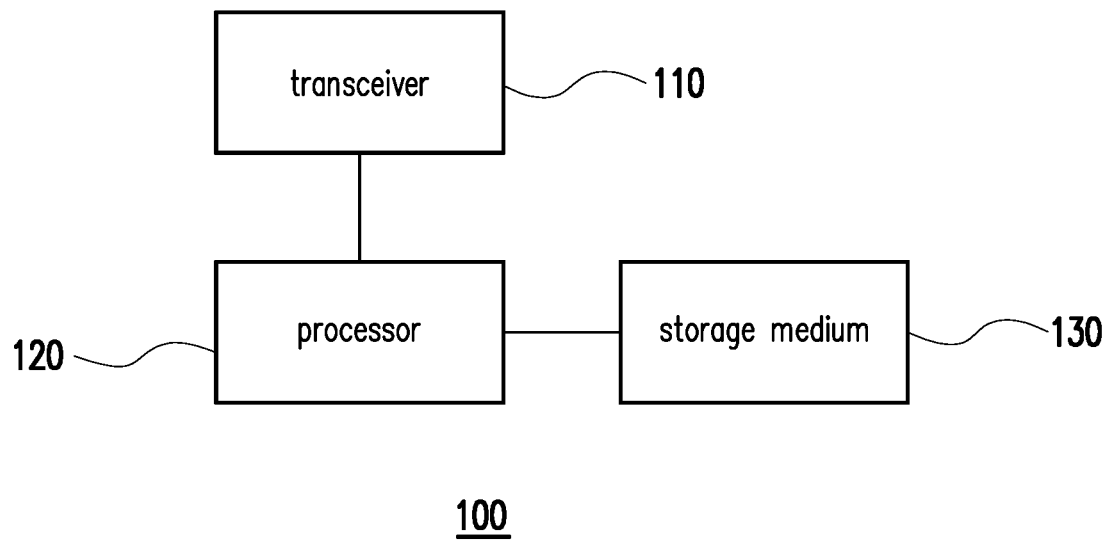
FIG. 10 is a block diagram of a communication device according to an embodiment of the disclosure.

FIG. 10 is a block diagram of a communication device according to an embodiment of the disclosure. Referring to FIG. 10, a communication device 100 may include but not limited to a transceiver 110, a processor 120, and a storage medium 130. The processor 120 is coupled to the transceiver 110 and the storage medium 130.

The transceiver 110 is coupled to the processor 120. The transceiver 110 may receive a DL signal and transmit a UL signal. The transceiver 110 may execute operations of Low Noise Amplifying (LNA), impedance matching, analog-to-digital (ADC) converting, digital-to-analog (DAC) converting, frequency mixing, up-down frequency conversion, filtering, amplifying and/or similar operations. The transceiver 110 may include the phased array 80 using analog beamforming or the phased array 90 using digital beamforming, and the phased array may include one or a plurality of antenna elements for transmitting and receiving omnidirectional antenna beams or directional antenna beams.

The processor 120 is, for example, a Central Processing Unit (CPU), or other programmable general purpose or special purpose microprocessor, a Digital Signal Processor (DSP), a programmable controller, an Application Specific Integrated Circuit (ASIC), a Graphics Processing Unit (GPU) or other similar components or a combination of the above components. The processor 120 may be configured to perform a method for measuring the AoA as described in FIG. 2 and FIG. 3.

The storage medium 130 is coupled to the processor 120, and is, for example, any type of a fixed or movable Random Access Memory (RAM), a Read-Only Memory (ROM), a flash memory, a Hard Disk Drive (HDD), a Solid State Drive (SSD), or similar components or a combination of the above components. The storage medium 130 stores a plurality of modules or programs for the processor 120 to access, such that the processor 120 may execute various communication functions of the communication device 100.

The communication device 100 may be a user equipment in a communication system. The term "user equipment" (UE) in this disclosure may be, for example, a mobile station, an advanced mobile station (AMS), a server, a client, a desktop computer, a laptop computer, a network computer, a workstation, a personal digital assistant (PDA), a tablet personal computer (PC), a scanner, a telephone device, a pager, a camera, a television, a hand-held video game device, a musical device, a wireless sensor, and the like. In some applications, a UE may be a fixed computer device operating in a mobile environment, such as a bus, a train, an airplane, a boat, a car, and so forth.

The communication device 100 may be a base station in a communication system. The term "base station" (BS) in this disclosure could be synonymous, for example, with a variation or a sub-variation of a "gNodeB" (gNB), an "eNodeB" (eNB), a Node-B, an advanced BS (ABS), a transmission reception point (TRP), an unlicensed TRP, a base transceiver system (BTS), an access point, a home BS, a relay station, a scatterer, a repeater, an intermediate node, an intermediary, satellite-based communication BSs, and so forth.

In a more complicated system having two devices communicating with each other, said the base station (STA) and the user equipment (UE), the signal power emitted may vary from time to time because the steering angle of the signal source may change for pursuing better quality of communication.

Figure 11A:
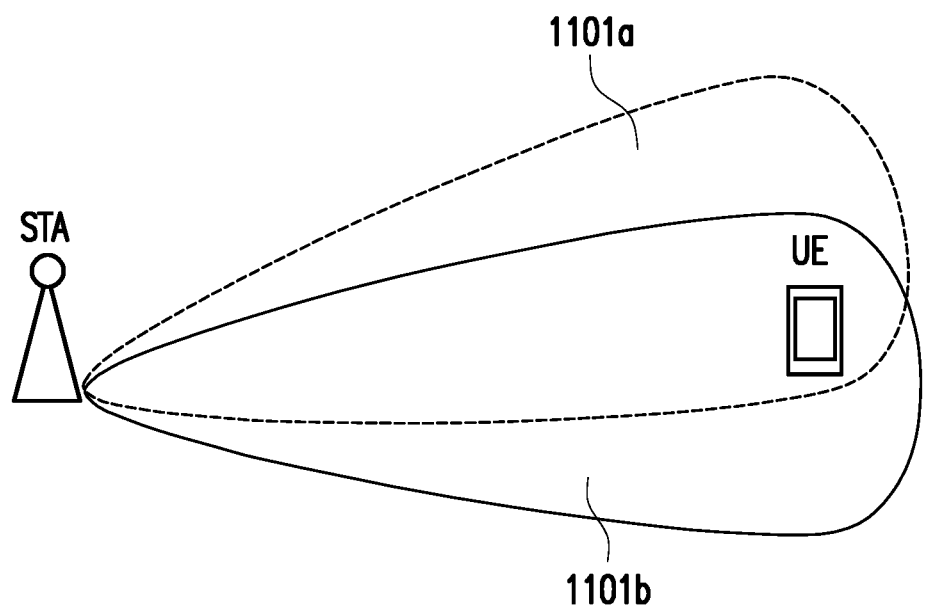
FIG. 11A is a schematic diagram of a communication system with a base station scanning for a user equipment according to an embodiment of the disclosure.

FIG. 11A is a schematic diagram of a communication system with a base station scanning for a user equipment according to an embodiment of the disclosure. For example, referring to FIG. 11A, the base station STA may perform scanning from beam 1101a to beam 1101b to establish communication with the UE. At a first stage, the base station STA operates at steering angle $\theta_{S1,STA}$ corresponding to beam 1101a. Next, at a second stage, the base station STA switches to a different steering angle $\theta_{S2,STA}$ corresponding to beam 1101b.

Figure 11B:
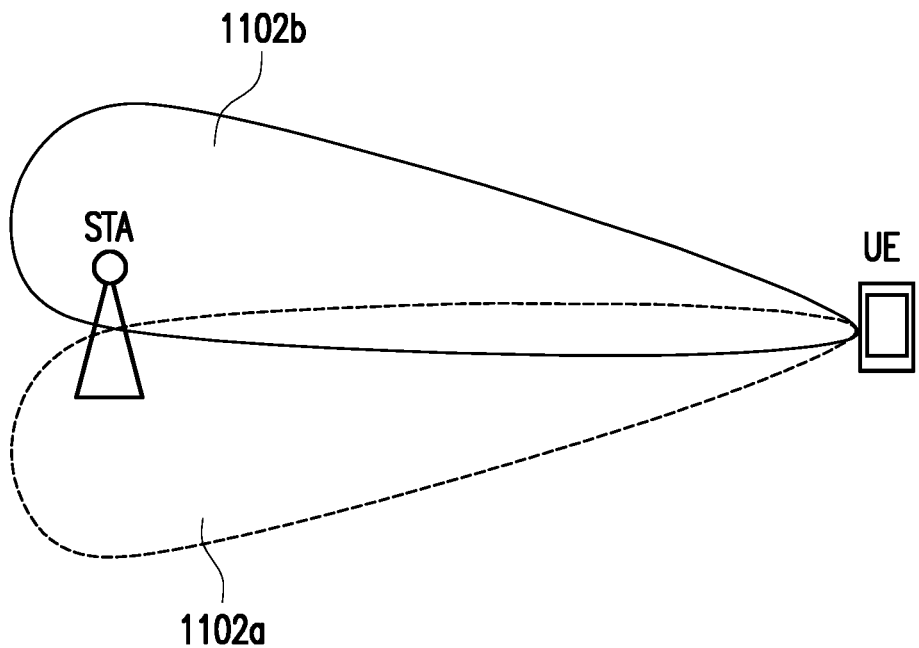
FIG. 11B is a schematic diagram of a communication system with a user equipment scanning for a base station according to an embodiment of the disclosure.

FIG. 11B is a schematic diagram of a communication system with a user equipment scanning for a base station according to an embodiment of the disclosure. For example, referring to FIG. 11B, the UE may perform scanning from beam 1102a to beam 1102b to establish communication with the STA. At a first stage, the UE operates at steering angle $\theta_{S1,UE}$ corresponding to beam 1102a. Next, at a second stage, the base station STA switches to a different steering angle $\theta_{S2,UE}$ corresponding to beam 1102b.

Figure 11C:
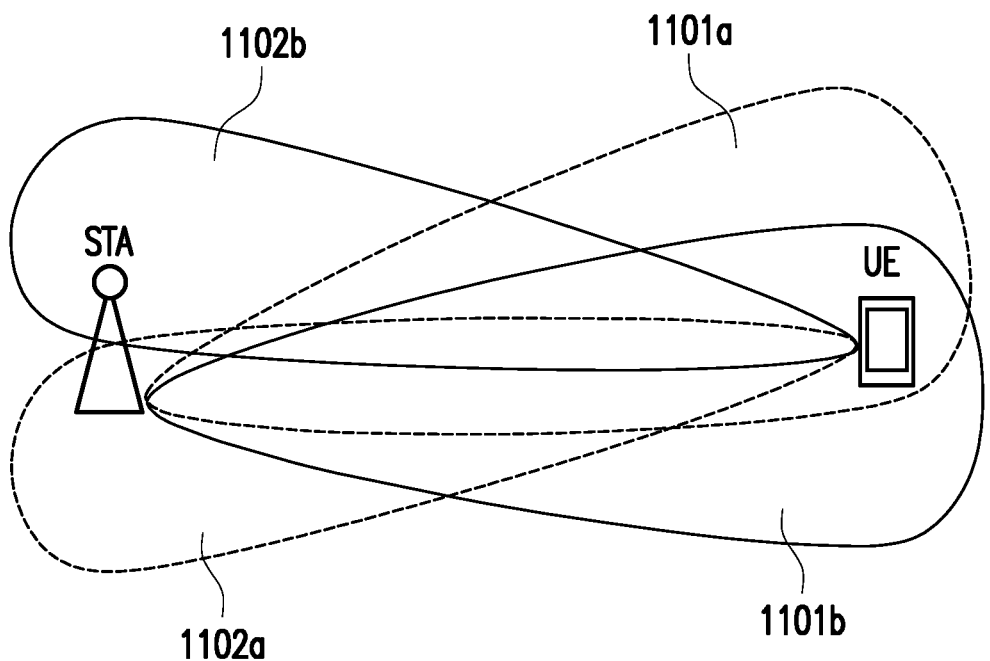
FIG. 11C is a schematic diagram of a communication system with a base station and a user equipment scanning for each other according to an embodiment of the disclosure.

FIG. 11C is a schematic diagram of a communication system with a base station and a user equipment scanning for each other according to an embodiment of the disclosure. In FIG. 11C, while the base station STA is scanning for the UE, the UE is also scanning for the base station. At a first stage, the base station operates at steering angle $\theta_{S1,STA}$, and the UE operates at steering angle $\theta_{S1,UE}$. At a second stage, the base station operates at steering angle $\theta_{S1,STA}$, and the UE operates at steering angle $\theta_{S1,UE}$.

It should be noted that for the base station STA to measure the AoA of the UE, the assumption for equations (7)-(10) may not necessarily hold because the steering angle of the UE changes from $\theta_{S1,UE}$ to $\theta_{S2,UE}$.

Under such circumstances, the transmitted packet from the STA to the UE may further include the information of the steering angle, the array size, and the estimated AoA measured by the STA. With such information, the UE is capable of estimating the antenna gain of the STA at the direction from STA towards the UE. Through the communication between the base station STA and the UE, the base station STA may obtain additional information such as the AoA of the base station STA estimated by the UE and/or the steering angles of the UE at different stages. Thus, the additional information may be utilized to compensate the error resulting from changing steering angles of the UE in the measurement of the AoA of the UE.

It is known that the relationship between the received power $P_r$ and the transmitted signal $P_t$ is:

$$P_r = P_t G_{TX}(\theta_{S,TX}, \theta_{AoD}) G_{RX}(\theta_{S,RX}, \theta_{AoA,RX}) \left(\frac{\lambda}{4\pi R}\right)^2 \quad (20)$$

Here, $\theta_{S,TX}$ denotes the steering angle of the signal source, i.e. the base station STA, $\theta_{AoD}$ denotes the angle of the receiver, i.e. the UE, seen by the signal source, $\theta_{S,RX}$ denotes the steering angle of the receiver, $\theta_{AoA,RX}$ denotes the AoA seen by the receiver, $G_{TX}$ and $G_{Rx}$ respectively denotes the power gain of the signal source and the receiver, $\lambda$ denotes the wavelength of the signal, and R denotes the distance between the signal source and the receiver. In the present example, the distance is assumed unchanged within such a short time, the wavelength of the signal is kept unchanged. though there is a little variation, and the power of the transmitted signal $P_r$ is also kept unchanged. Therefore, $\theta_{AoA,RX}$ may be precisely obtained once $G_{TX}(\theta_{S,TX}, \theta_{AoD})$ and $\theta_{S,RX}$ are known. In one embodiment, the UE may be considered as the signal source, and the base station may be considered as the receiver, and vice versa.

Figure 12:
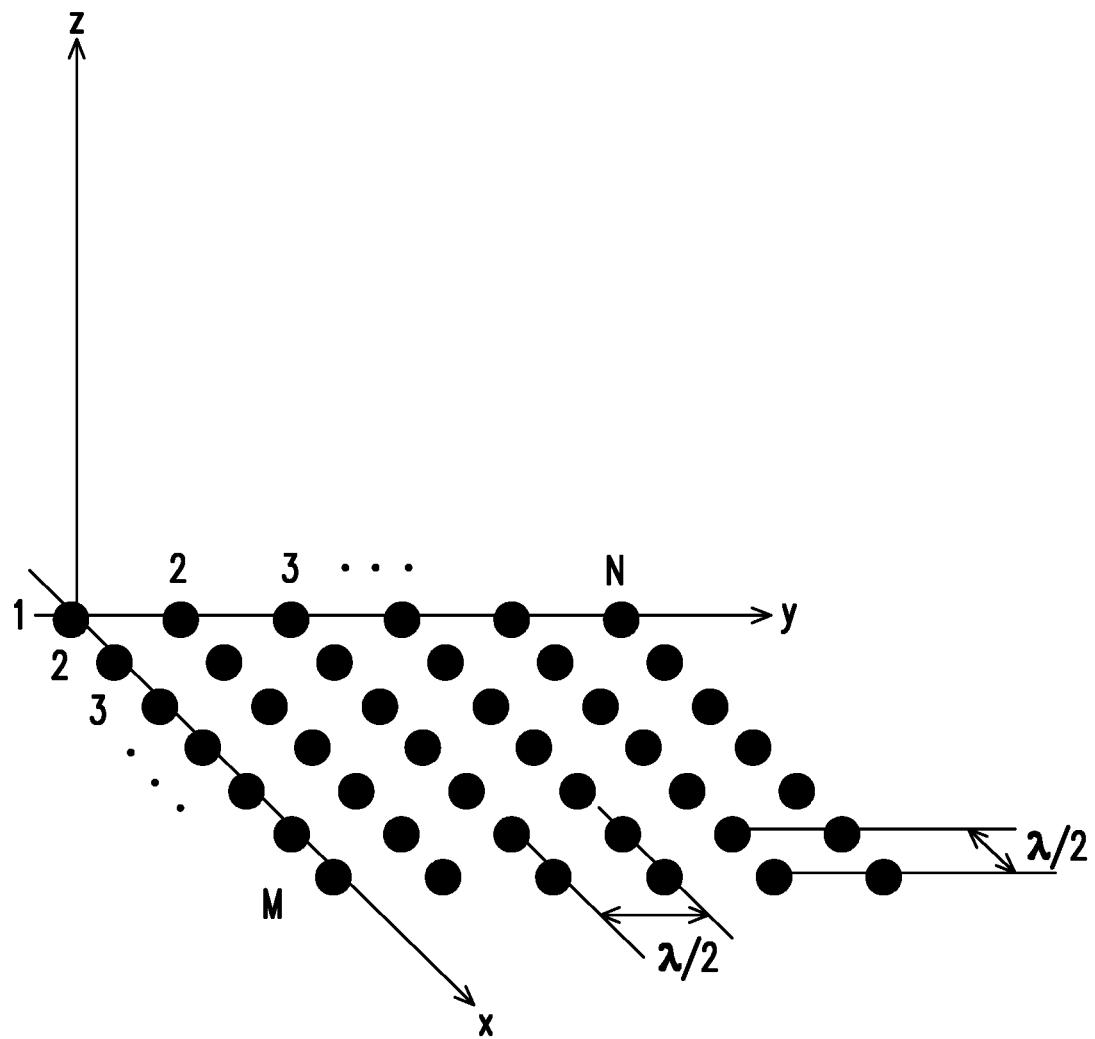
FIG. 12 is a schematic diagram of a two-dimensional phased array according to an embodiment of the disclosure.

FIG. 12 is a schematic diagram of a two-dimensional phased array according to an embodiment of the disclosure. The method for measuring an AoA as described in the embodiments of FIG. 2 and FIG. 3 may also be apply to a two-dimensional phased array. For example, as shown in FIG. 12, a two-dimensional phased array may include MN antenna elements. The antenna elements may be arranged with uniform spacing $\lambda/2$ in along the x-axis and y-axis respectively. Under such configuration, the small HPBW may cause a larger number of iterations to calculate the AoA. However, the proposed method requires less scanning time and is more power-efficient because the proposed method only needs fewer amount of data and computations to obtain a satisfactory estimate of the AoA.

In view of the aforementioned descriptions, the disclosure provides a method for measuring an angle of arrival (AoA), with a steerable phased array. A parabolic approximation for the array factor of a beam radiation pattern is disclosed in the embodiments of the disclosure. The method provides a converged result for fast tracking in rapid measurement of a correct AoA. The method applies to both of analog beam-forming and digital beamforming architectures, and the method is operable in an on-the-fly application of device or beam tracking.

What is claimed is:

1. A method for measuring an angle of arrival (AoA) with a steerable phased array, comprising:
   receiving a signal by the steerable phased array with a first steering angle and with a second steering angle;
   obtaining a first power-related information (PRI1) of the signal corresponding to the first steering angle;
   obtaining a second power-related information (PRI2) of the signal corresponding to the second steering angle; and
   calculating an AoA of the signal based on a ratio of the first power-related information and the second power-related information,
   wherein the AoA is calculated from the first steering angle and a first difference angle $\Delta\theta_1$, wherein the first difference angle $\Delta\theta_1$ is calculated by $$\Delta\theta_1 = \begin{cases} \dfrac{-b + \sqrt{b^2 - 4ac}}{2a} & \text{for } \Delta\theta_S > 0 \\ \dfrac{-b - \sqrt{b^2 - 4ac}}{2a} & \text{for } \Delta\theta_S < 0 \end{cases},$$

wherein $\theta_{S1}$ is the first steering angle, $\theta_{S2}$ is the second steering angle, $\Delta\theta_S = \theta_{S2} - \theta_{S1}$ is the difference between the first steering angle and the second steering angle, and the coefficients a, b and c are $$a = \cos^2\theta_{S1} - \cos^2\theta_{S2},$$

$$b = 2\Delta\theta_S \cos^2\theta_{S2},$$

$$c = -\Delta\theta_S^2 \cos^2\theta_{S2} - \frac{\Delta G_{RX,dB}}{m},$$

wherein $\Delta G_{RX,dB}$ is a decibel value of a ratio between the first power-related information and the second power-related information, and m is a real number,
wherein the first steering angle is different from the second steering angle, and an absolute difference between the first steering angle and the second steering angle is less than first null beam width (FNBW)/2.

2. The method of claim 1, wherein the step of receiving the signal by the steerable phased array with the first steering angle and with the second steering angle comprises:
switching the steerable phased array to the first steering angle to receive the signal in a first time slot; and
switching the steerable phased array to the second steering angle to receive the signal in a second time slot right after the first time slot.

3. The method of claim 1, wherein the step of receiving the signal by the steerable phased array with the first steering angle and with the second steering angle comprises:
receiving the signal by N selected antenna elements in the steerable phased array to obtain N signal streams corresponding to a first time slot;
applying a first set of parameters onto the N signal streams before aggregating the N signal streams so as to digitally apply the first steering angle onto an aggregated signal; and
applying a second set of parameters onto the N signal streams before aggregating the N signal streams so as to digitally apply the second steering angle onto the aggregated signal.

4. The method of claim 1, wherein the first power-related information and the second power-related information are expressed in a measure that is selected from a group consisting of received power, signal-to-noise ratio, error vector magnitude, bit-error rate, and carrier-to-noise ratio.

5. The method of claim 1, wherein:

$$m = \frac{(Nd/\lambda)^2}{296},$$

wherein N is number of antenna elements, d is spacing between two adjacent antenna elements, $\lambda$ is wavelength of the signal.

6. The method of claim 1, wherein the absolute difference between the first steering angle and the second steering angle is less than half-power beam width (HPBW)/2.

7. The method of claim 6, wherein the absolute difference between the first steering angle and the second steering angle is less than HPBW/4.

8. The method of claim 1, further comprising:
taking the calculated AoA as a third steering angle;
receiving the signal by the steerable phased array with the third steering angle;
obtaining a third power-related information (PRI3) of the signal corresponding to the third steering angle; and
updating the AoA according to the third power-related information and the third steering angle.

9. The method of claim 8, wherein the step of updating the AoA further comprising:
calculating a new AoA based on the third power-related information and at least one of the first power-related information and the second power-related information; and
updating the AoA by the new AoA.

10. The method of claim 8, wherein the step of updating the AoA further comprising:
calculating a steering angle having the maximum power-related information from a parabolic function obtained from three pairs of the first, second and third steering angles and the corresponding first, second and third power-related information; and
updating the AoA by the calculated steering angle.

11. A communication device, comprising:
a transceiver, comprising a steerable phased array;
a storage medium; and
a processor, coupled to the transceiver and the storage medium, wherein the processor is configured to:
receive a signal by the steerable phased array with a first steering angle and with a second steering angle;
obtain a first power-related information (PRI1) of the signal corresponding to the first steering angle;
obtain a second power-related information (PRI2) of the signal corresponding to the second steering angle; and
calculate an angle of arrival (AoA) of the signal based on a ratio of the first power-related information and the second power-related information,
wherein the AoA is calculated from the first steering angle and a first difference angle $\Delta\theta_1$, wherein the first difference angle $\Delta\theta_1$ is calculated by $$\Delta\theta_1 = \begin{cases} \dfrac{-b + \sqrt{b^2 - 4ac}}{2a} & \text{for } \Delta\theta_S > 0 \\ \dfrac{-b - \sqrt{b^2 - 4ac}}{2a} & \text{for } \Delta\theta_S < 0 \end{cases},$$

wherein $\theta_{S1}$ is the first steering angle, $\theta_{S2}$ is the second steering angle, $\Delta\theta_S = \theta_{S2} - \theta_{S1}$ is the difference between the first steering angle and the second steering angle, and the coefficients a, b and c are $$a = \cos^2\theta_{S1} - \cos^2\theta_{S2},$$
$$b = 2\Delta\theta_S \cos^2\theta_{S2},$$
$$c = -\Delta\theta_S^2 \cos^2\theta_{S2} - \frac{\Delta G_{RX,dB}}{m},$$

wherein $\Delta G_{RX,dB}$ is a decibel value of a ratio between the first power-related information and the second power-related information, and m is a real number,
wherein the first steering angle is different from the second steering angle, and an absolute difference between the first steering angle and the second steering angle is less than first null beam width (FNBW)/2.

12. The communication device of claim 11, wherein the processor is further configured to:
take the calculated AoA as a third steering angle;
receive the signal by the steerable phased array with the third steering angle;
obtain a third power-related information (PRI3) of the signal corresponding to the third steering angle; and
update the AoA according to the third power-related information and the third steering angle.

13. The communication device of claim 12, wherein the processor is further configured to:
calculate a new AoA based on the third power-related information and at least one of the first power-related information and the second power-related information; and
update the AoA by the new AoA.

14. The communication device of claim 12, wherein the processor is further configured to:
calculate a steering angle having the maximum power-related information from a parabolic function obtained from three pairs of the first, second and third steering angles and the corresponding first, second and third power-related information; and update the AoA by the calculated steering angle.

* * * * *